United States Patent
Ellison et al.

(10) Patent No.: US 7,416,138 B2
(45) Date of Patent: Aug. 26, 2008

(54) THERMAL BYPASS CHANNEL

(75) Inventors: Kenneth H Ellison, Orion, MI (US);
Eugene M. Kozak, Royal Oak, MI (US);
Steven B. Marshall, Oxford, MI (US);
Paul H. Carlson, Columbiaville, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 453 days.

(21) Appl. No.: 11/095,058

(22) Filed: Mar. 31, 2005

(65) Prior Publication Data

US 2006/0208100 A1 Sep. 21, 2006

Related U.S. Application Data

(60) Provisional application No. 60/658,190, filed on Mar. 3, 2005.

(51) Int. Cl.
*B60H 1/02* (2006.01)

(52) U.S. Cl. ............................. 237/12.3 R; 237/12.3 B; 165/41; 165/42

(58) Field of Classification Search ............ 237/12.3 R, 237/12.3 B, 69, 43; 123/142.5 E; 165/41, 165/42, 56, 49, 171; 454/185
See application file for complete search history.

(56) References Cited

U.S. PATENT DOCUMENTS

| | | | | |
|---|---|---|---|---|
| 1,966,882 A | * | 7/1934 | Bucklen | ................. 237/12.3 B |
| 3,550,522 A | * | 12/1970 | Bauer et al. | .................. 454/144 |
| 4,398,081 A | * | 8/1983 | Moad | ........................... 219/202 |
| 4,913,347 A | * | 4/1990 | Burst et al. | .................... 236/13 |
| 5,167,129 A | * | 12/1992 | Akasaka | ....................... 62/179 |
| 5,228,475 A | | 7/1993 | Trill | |
| 5,255,733 A | * | 10/1993 | King | ........................... 165/299 |
| 5,291,960 A | * | 3/1994 | Brandenburg et al. | ...... 180/65.2 |
| 5,449,321 A | * | 9/1995 | Dauvergne | ................... 454/139 |
| 5,906,177 A | * | 5/1999 | Okabe et al. | ................... 122/26 |
| 6,332,330 B1 | * | 12/2001 | Loup et al. | .................... 62/244 |
| 6,383,672 B1 | * | 5/2002 | Fujita | ........................... 429/26 |
| 6,415,851 B1 | * | 7/2002 | Hall et al. | ....................... 165/42 |
| 6,448,535 B1 | * | 9/2002 | Ap | .............................. 219/208 |
| 6,454,180 B2 | * | 9/2002 | Matsunaga et al. | ...... 237/12.3 B |
| 6,554,695 B2 | * | 4/2003 | Elliot | ........................... 454/139 |
| 6,595,433 B2 | * | 7/2003 | Ap et al. | ................. 237/12.3 B |
| 6,616,522 B2 | * | 9/2003 | Colinet | ....................... 454/121 |
| 6,634,938 B2 | | 10/2003 | Vincent | |
| 6,773,340 B2 | * | 8/2004 | Nakagawa et al. | ........... 454/144 |
| 6,857,282 B2 | * | 2/2005 | Shichiken et al. | .............. 62/244 |
| 6,886,350 B2 | * | 5/2005 | Petesch et al. | .................. 62/97 |
| 6,942,564 B1 | * | 9/2005 | Roland et al. | ................ 454/156 |
| 7,169,036 B2 | * | 1/2007 | Tanoi | ........................ 454/121 |

\* cited by examiner

*Primary Examiner*—Derek S. Boles
(74) *Attorney, Agent, or Firm*—Dierker & Associates, P.C.

(57) ABSTRACT

The present invention relates to distribution of conditioned air from automotive HVAC units, in particularly, distribution systems having both front and rear components. In particular, the present invention improves the temperature characteristics of the rear floor area of distribution in the cockpit, cab or passenger compartment, in a variety of temperature modes.

By providing for a valving or closing off means on a rear distribution door, regulation and adjustment of the stratification and temperature of air reaching the rear, and especially, the rear floor area of the cockpit, cab or passenger compartment, is achieved by blocking or closing off a channel between the heater core area of the HVAC and the distribution system.

13 Claims, 7 Drawing Sheets

THERMAL BYPASS CHANNEL

This application claims priority of provisional application 60/658,190 filed Mar. 3, 2005

FIELD OF THE INVENTION

The present invention relates to distribution of conditioned air from automotive HVAC units, in particular, distribution systems having both front and rear components.

BACKGROUND OF THE INVENTION

In automotive distribution systems for conditioned air, such as air that has passed through the HVAC unit of an air conditioning and distribution system, many different architectures have been tried. Some system architectures are laid out such that it is difficult or impossible to achieve desired level of rear and front, and/or bi-level and/or mix mode distributions, or mixed stratifications with the fixed geometry or architecture of the unit. Bi-level modes usually profoundly affect panel and floor distribution; mix modes affect defrost and floor distribution. Particularly as it relates to distribution systems having components, components such as the rear panel or panels often share a feed duct with or within the rear floor. These systems, while providing air to the rear areas of the automotive vehicle, inherently cause the rear and front floor temperatures to track one another or to essentially follow the same heat distribution. Therefore, for example, if a cooler panel mode in the rear is necessary, the HVAC is set up so that hot air is fed to track the air flowing through the floor. In other words, the current system architectures cannot accommodate both requirements of cooler panel mode and hot air tracking at the same time, or other similar modes.

Attempts to provide for an increased or unaffected temperature solution to rear conditioned air delivery using a prior art system architecture, yield panel or defrost mode risk of degradation (or inappropriate reduction or addition of heat) to yield inappropriate or undesirable temperature effects in the front of the vehicle due to changes in the temperature of conditioned air provided to the rear of the vehicle. The present invention, in addition to allowing for increased or non-effected temperatures to the rear of the vehicle, does so without degrading or otherwise inappropriately reducing or adding heat or yielding inappropriate or undesirable temperature effects in the front of the vehicle. In addition, in preferred embodiments of the present invention, not only does the present invention prevent degradation, particularly in panel or defrost modes, it does so without the addition of extra doors or levers or cams.

SUMMARY OF THE INVENTION

The present invention, unlike the prior art, is able to achieve a variable stratification of different temperatures, and, specifically, different air temperatures, between different modes, e.g. hot and cold and mixed or blended modes. The present invention allows for this stratification, even when air is taken from essentially the same regions in the HVAC, to yield the desired temperatures, particularly in the rear distribution areas of the distribution system. The present invention, providing for commonly used doors and/or flaps as in currently used architectures, by providing for a constructed channel, solves the problem of inappropriate conditioned air temperature and on balanced air stratification, without additional or special parts. By providing for a valving or closing off means or structure in association with a door or flap, regulation and adjustment of the stratification and temperature of air reaching the rear, and especially, the rear floor area of the cockpit, cab or passenger compartment, is achieved by simple modifications in current structures. The valving or closing structure can be flexible or inflexible. Preferably, the valving or closing means is inflexible, i.e. substantially unaffected by flow forces. The present invention, therefore, provides a new technology using no additional parts, and simplicity in manufacture, not found in the prior art, while allowing for front to rear bi-level, mix or other appropriate modes maintenance or air stratification while maintaining desired temperature conditions, particularly in the rear distribution area and the passenger compartment. At least one air heating device, and at least one air cooling device, is present in preferred embodiments of the present invention. Also in preferred aspects of the present invention, a mixing baffle is located in the air conductor or duct between the evaporator area and rear distribution area or duct of the automotive vehicle.

In a number of conditioning situations, it is desirable that the conditioned air be provided with certain temperature characteristics, especially at the area of final distribution in the automotive vehicle cockpit or cab or passenger compartment. In particular, the preferred embodiments of the present invention improve the temperature characteristics of the rear floor area of distribution in the cockpit, cab or passenger compartment, in a variety of temperature modes. For example, in preferred embodiments of the present invention, the rear floor is provided with prescribed temperature conditioned air within a specified range by providing rear floor air from the distribution in bi-level, mixed or full hot modes. The temperature of the conditioned air is, therefore, improved in either blending conditions such as bi-level and mix modes or other appropriate modes, as well in full hot modes. In preferred embodiments of the present invention, the final distribution of the conditioned air, and, in particular, air provided to the rear or rear floor of the automobile cockpit, cab or passenger compartment, is provided without or generally without reduced stratification or tracking issues. The present invention even more preferably achieves a balance of rear to front distribution of conditioned air, at the desired temperatures, in bi-level or mix modes or other appropriate modes.

Attempts to provide for an increased or unaffected temperature solution to rear conditioned air delivery using a prior art system architecture, has often led to risk of panel or defrost mode degradation or inappropriate reduction or addition of heat causing inappropriate or undesirable temperature effects in the front of the vehicle due to changes in the temperature of conditioned air provided to the rear of the vehicle. The present invention, in addition to allowing for increased or non-effected temperatures to the rear of the vehicle, does so without degrading or otherwise inappropriately reducing or adding heat or yielding inappropriate or undesirable temperature effects in the front of the vehicle. In addition, in preferred embodiments of the present invention, not only does the present invention prevent degradation, particularly in panel or defrost modes and/or other appropriate modes, it does so without the addition of extra doors or levers or cams.

In the preferred embodiments of the present invention, a valving or closing off means or device or structure, such as a tab, wall or baffle, has the effect of 'valving' or closing off a channel which is constructed to pass directly from the heater core area of the HVAC unit to the rear distribution system. This valving means, such as an extra tab or a wall or a baffle, is preferably added to, attached to, or more preferably, integral with, especially via molding or other methods, the rear mode door of the distribution system.

DETAILED DESCRIPTION OF THE INVENTION

As disclosed above, the present invention allows for stratification of different temperatures of conditioned air in different areas of the motorized vehicle. By allowing for variable stratification, the desired temperatures of both the front and rear areas, and, in particular, the rear floor areas of the cockpit or cab or passenger compartment, of the vehicle, are achievable. Floor, panel, defrost and bi-level conditioning air distribution is possible with the various modes with better temperature control in their respective distribution areas.

As such, the present invention provides for an air distribution system for a heating, ventilation and/or air conditioning purposes for an automotive vehicle having an HVAC unit with at least one air heating device and at least one air cooling device, and a heater core area immediately downstream of the air heating device and an evaporator area immediately downstream of the air cooling device, and front and rear distributions areas, comprising: an air conductor or duct to convey air downstream from the evaporator area of the HVAC unit towards a rear distribution area of the automobile vehicle; and at least one distribution door; at least one channel or hot channel located directly between the heater core area of the HVAC unit and the air conductor or duct downstream of the evaporator area of the HVAC unit. In preferred embodiments of the present invention, the distribution door is located between the air conductor or duct downstream of the evaporator area and the channel or hot channel. Preferably, the distribution door has a valving or closing device or structure located on, attached to, or integral to the door, more preferably, the air distribution system has at least one valving or closing device or structure integral to the door.

When the HVAC unit and the conditioned air distribution system of the present invention is in floor mode, the present invention provides for a system whereby when there is a boost in the rear floor temperatures. This boost is due to the presence of a shortened air path from HVAC unit to final distribution area via the channel provided as described above.

Furthermore, the present invention overcomes prior art inherent architectural fixed issues, which have compromised either rear floor or rear panel temperatures in prior art system architectures. Rear panel closed off, while the rear floor is boosted with hot air flow.

Figure 2:
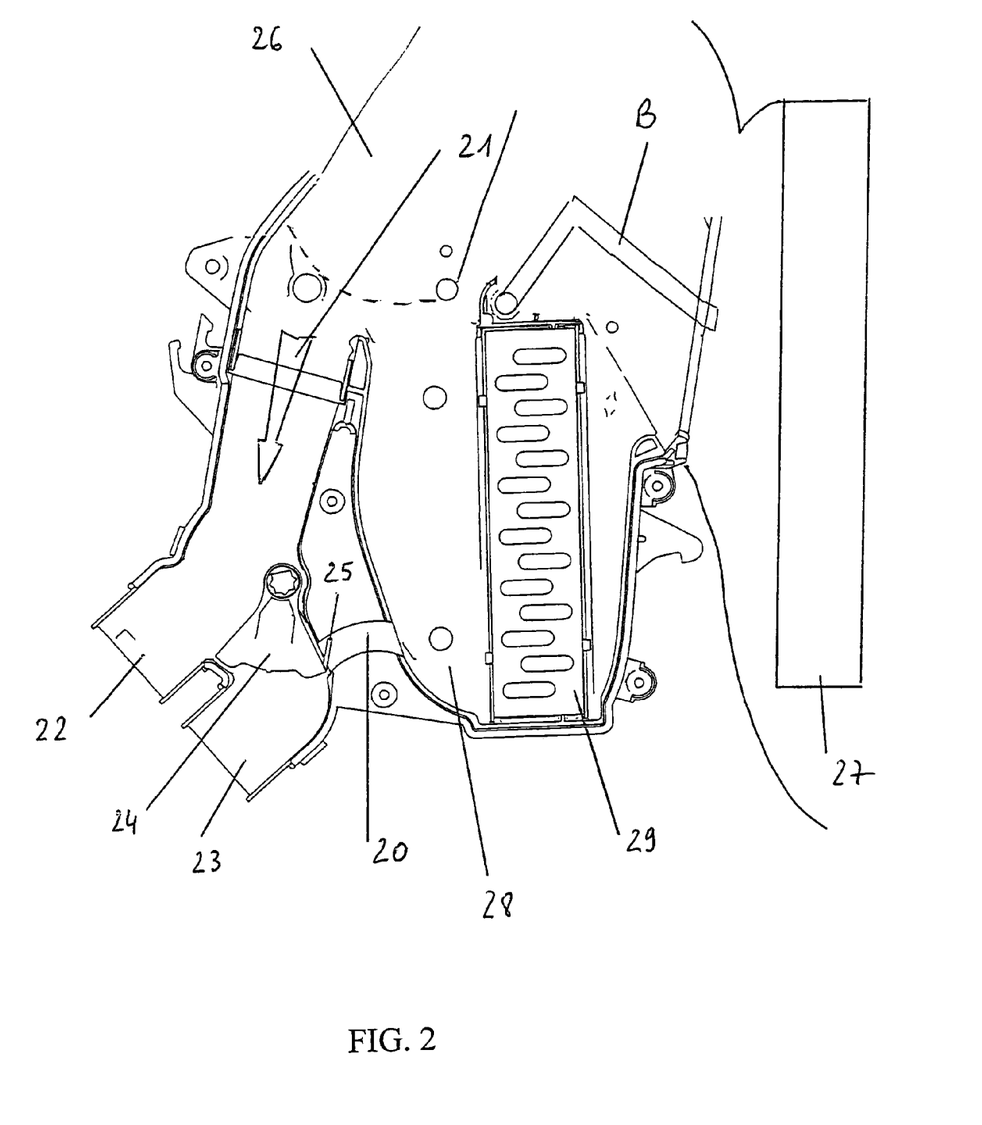
FIG. 2 is a cross sectional schematic view of a rear unit in an air conditioning distribution system with rear distribution door in panel mode, showing tab/wall/baffle on the door, in accordance with an aspect of the present invention.

As seen in the Figures, when the HVAC unit and the conditioned air distribution system are in panel mode, such as in FIG. 2, the arrangement of the valving, device or structure is such that in panel mode there is no heat pickup or excess warming of the rear panel flow. The thermal bypass channel is closed off. The rear panel stays cool and rear floor is blocked or closed off.

Figure 3:
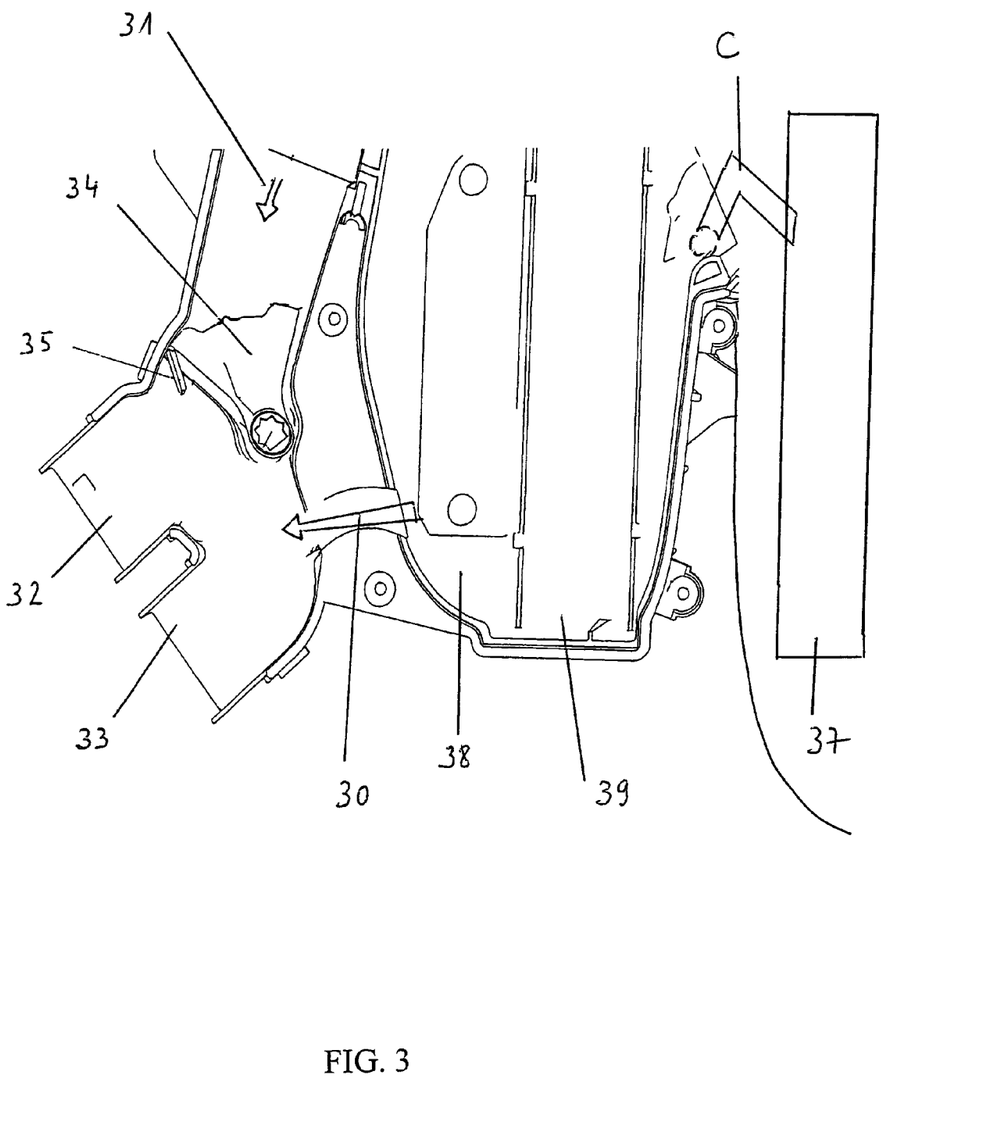
FIG. 3 is a cross sectional schematic view of an rear unit in an air conditioning distribution system with rear distribution door in defrost mode, in accordance with an aspect of the present invention.

When the HVAC unit and conditioned air distribution system is in defrost mode, in the present invention, as for example in FIG. 3, the constructed channel provides a small area of air leakage or 'bleed' to the rear floor area of the vehicle, without degrading the defrost flow rate. By conditioned air it is generally meant air that has gone through a part of the HVAC unit or that is or may be mixed with air that has gone through a part of the HVAC unit, prior to reaching its finally intended distribution area or region in the motorized vehicle.

Figure 4:
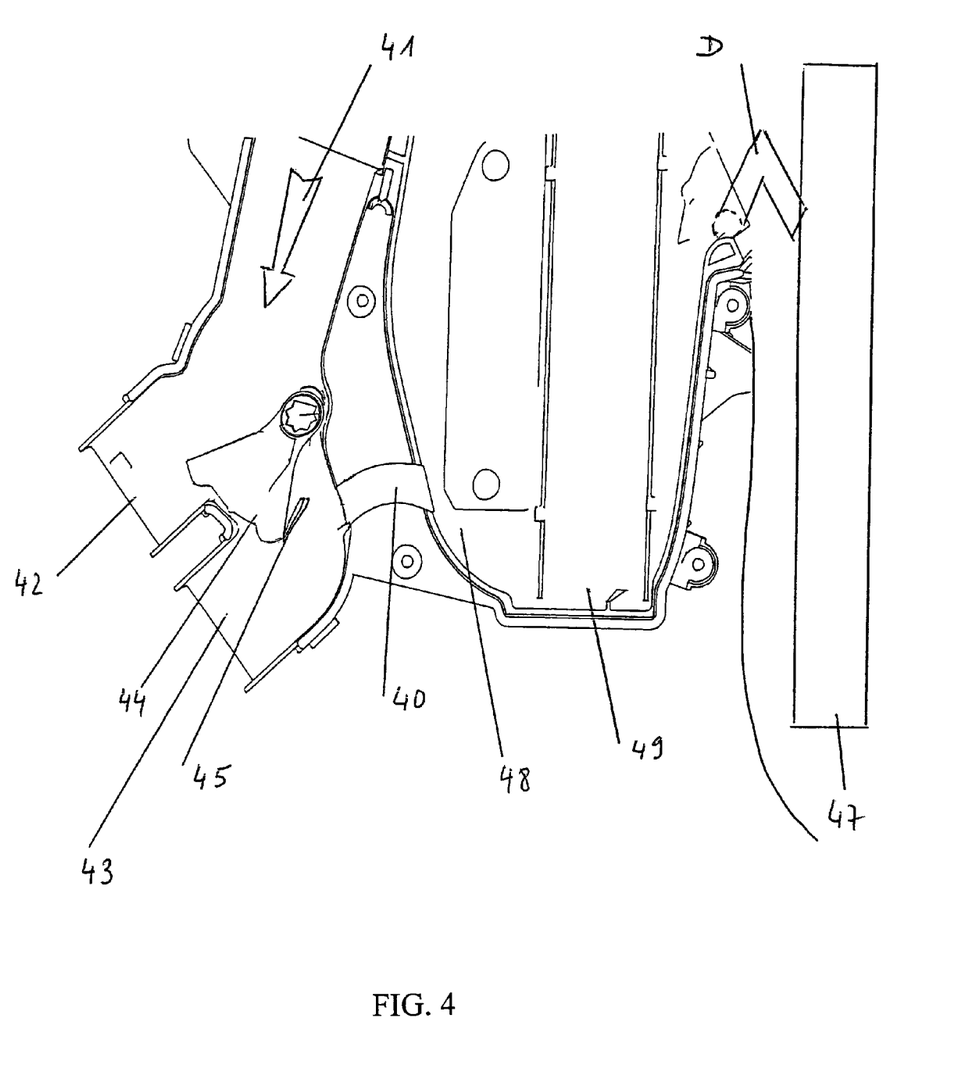
FIG. 4 is a cross sectional schematic view of an rear unit in an air conditioning distribution system with rear distribution door in mixed mode, in accordance with an aspect of the present invention.

When the HVAC unit and conditioned air distribution system of the present invention is in bi-level mode, as for example in FIG. 4, having a constructed channel and, preferably, a door that directs hot conditioned air towards the rear floor distribution area or duct, the present invention allows for increased stratification or air temperature between a rear floor and a rear panel or panels. In preferred embodiments of the present invention, when the HVAC unit and conditioned air distribution system is in mix mode, a constructed channel, and, more preferably, a channel and a door, directs hot air generated in the area where is situated a heating device or the "heater core" area, into an air-off or air exit region, and towards the rear floor distribution area or duct, as well as providing a boost in rear floor temperatures due to a boost of appropriate level in temperature of the air to the rear area of the vehicle through the distribution system or duct.

The present invention, in its preferred embodiments, provides for a channel constructed between the heater core air-off region of the HVAC unit and the rear distribution region of the distribution system. As can be seen in FIG. 2 the channel is valved or closed off only in panel mode by a valving or closing means or device, in such a case a structure such as a tab, a wall, or a baffle, or the like, which in located on, or is, preferably attached, or more preferably, integral to the door or flap positioned near the channel. In all modes other than panel mode, such as in FIGS. 1, 3 and 4, the structure located on, attached or integral to the door or flap, does not valve or close the channel, and the channel, therefore, deliberately remains open for the passage of hot air.

For purposes of the present invention, a heating device can, without limitation, be, for example, a radiator, PTC, electric heater, heater element, core or the like.

The present invention, therefore, preferably allows the distribution of hot air (air from the heating device of the HVAC unit), via a channel to the rear distribution area of the distribution system, and, more particularly, to the floor area, preferably via a floor duct or the like, or in a so called 'floor duct take-off' from the rear distribution. The primary effect of the opening or valving of the channel that leads to the rear distribution area of the conditioned air distribution system, is to increase rear floor temperatures in the vehicle. When the channel is closed off or valved shut in panel mode, the heat from the heater core tends not to pass and normally the great majority of the air does not pass, towards the rear panel duct take-off from the rear distribution. The present invention, therefore, allows for various modes to function with temperatures regulated to achieve maximum rear area comfort, in all possible modes, without comfort or temperature conditions in one mode adversely compromising those in another.

The types of closing or valving devices or structures useful in the present invention, can be numerous. In the preferred embodiments of the present invention, a closing or valving device that is able to close off the channel constructed from the heater core area or region to the rear conditioned air distribution area or region, is necessary, such that the valving or closing devices closes off the channel only in panel mode. As described above, the valving or closing device may be located on, attached or otherwise integrated with, an otherwise standard the flap or door, particularly those used in HVAC units or distribution systems. Examples of such types of flaps and doors can be flag doors, barrel doors or butterfly type doors, or flaps or combinations of any of the above. By providing for a valving or closing device that allows a closing or valving surface or feature on the door or flap, such that the channel can be essentially sealed off when the distribution is in the panel mode, the present invention, in its preferred embodiments, provides for correct distribution and balance of different temperatures of conditioned air as needed in both the front and rear portions of the motor vehicle.

Figure 1:
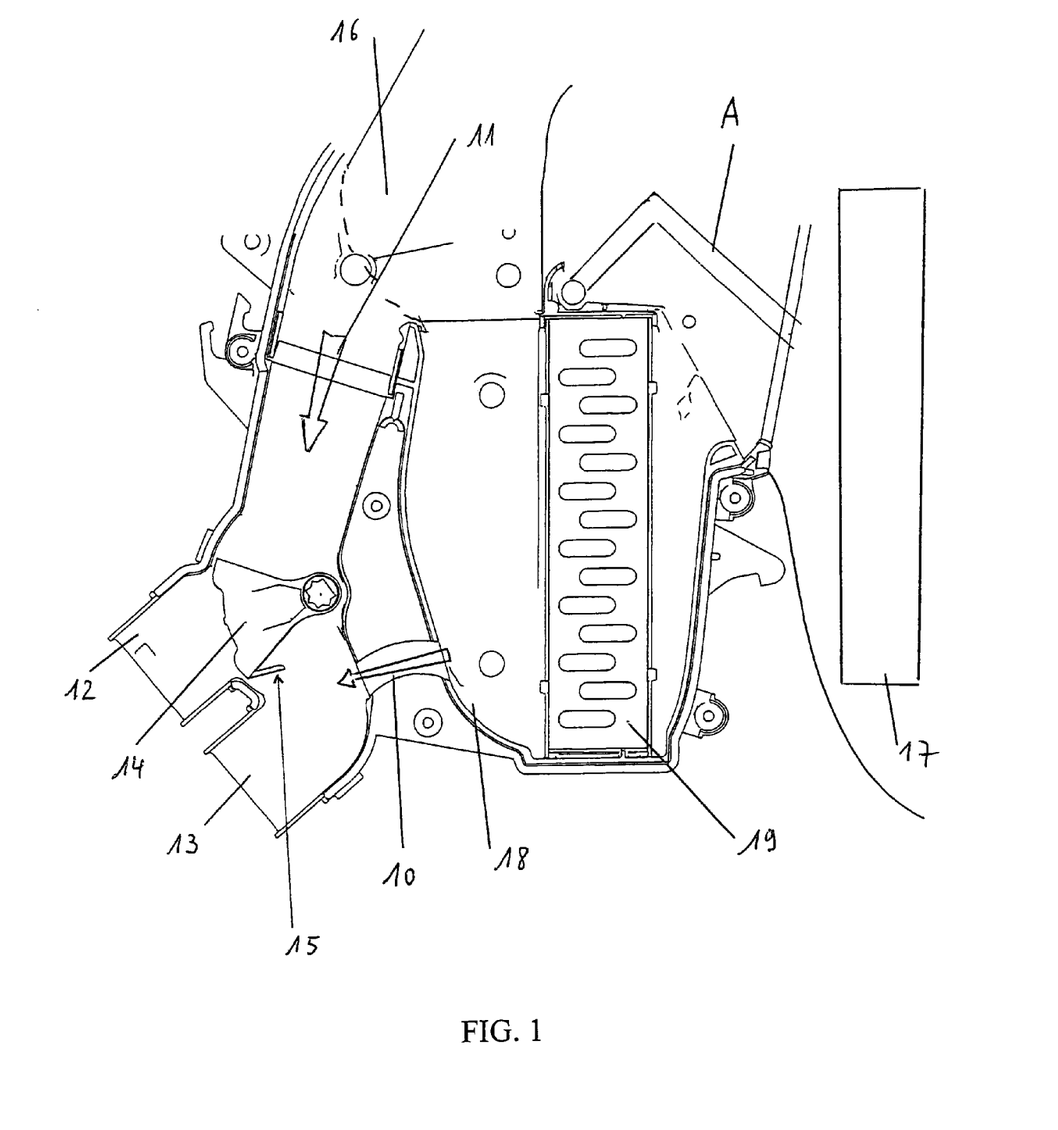
FIG. 1 is a cross sectional schematic view of a rear unit in an air conditioning distribution system with rear distribution door in floor mode, in accordance with an aspect of the present invention.

Referring to FIG. 1, is illustrated a schematic cross section of part of an HVAC unit in floor mode with distribution ducts for panel, floor, defrost, demist, rear floor, rear panel anticipated. Cooler air from the area of the evaporator (17) and mixing baffle (16) follows air path (11) towards rear distributions rear panel and rear floor (12, 13). Rear distribution mode door (14) has closing or valving device (15) on the door. Hot air from heater core (19) passes through hot air (heater core area) area (18) through channel or hot channel (10) to enter rear floor warm region (13) of rear conditioned air distribution ducts. Blend door A is illustrated.

Referring to FIG. 2, is illustrated a schematic cross section of part of an HVAC unit in panel mode with distribution ducts for panel, floor, defrost, demist, rear floor, rear panel anticipated. In the panel mode, the cooler air from the area of the evaporator (27) and, optionally, mixing baffle (26), follows air path (21) towards rear panel distribution (22). Rear distribution mode door (24) has closing or valving device (25) on the door, the closing device (25) closing or valving hot channel (20). Hot air from heater core (29) passes through a region near the heater core (the so called hot air or 'heater core' area) (28) but cannot pass through channel or hot channel (20) to enter rear floor warm region (23) of rear conditioned air distribution ducts. Only cooler air passes through cool rear panel region (22) from (21). Blend door B is illustrated. The rear panel stays cool.

Referring to FIG. 3, is illustrated a schematic cross section of part of an HVAC unit in defrost mode for panel, floor, defrost, demist, rear floor, rear panel anticipated. In the defrost mode, the cooler air from the area of the evaporator (37) and is blocked to air path (31) towards rear distributions (32, 33). Rear distribution mode door (34) has closing or valving device consisting of a tab, wall, baffle or the like (25) integral with the door, the closing device (35) not closing or valving hot channel (30), the channel that has been constructed between the hot air (heater core) area (38) to the rear floor warm region (33). Hot air from heater core (39) passes through hot air area (38) through channel or hot channel (30) to enter rear floor warm region (32, 33) of rear conditioned air distribution ducts. This provides quiescent heat mainly to the rear floor (34) and some to rear panel (32). Blend door C is illustrated.

Referring to FIG. 4, is illustrated a schematic cross section of part of an HVAC unit in bi-level mode with distribution ducts for panel, floor, defrost, demist, rear floor, rear panel anticipated. In bi-level or mixed modes, cooler air from follows air path (41) towards rear distribution area (42). Rear distribution mode door (44) has closing or valving device (45) on the door. Hot air from heater core (49) passes through hot air (heater core) area (48) through channel or hot channel (40) to enter rear floor warm region (43) of rear conditioned air distribution ducts. Cooler air passes into rear panel cool region (42). Thus thermal stratification is achieved. Blend door D is illustrated.

Figure 5:
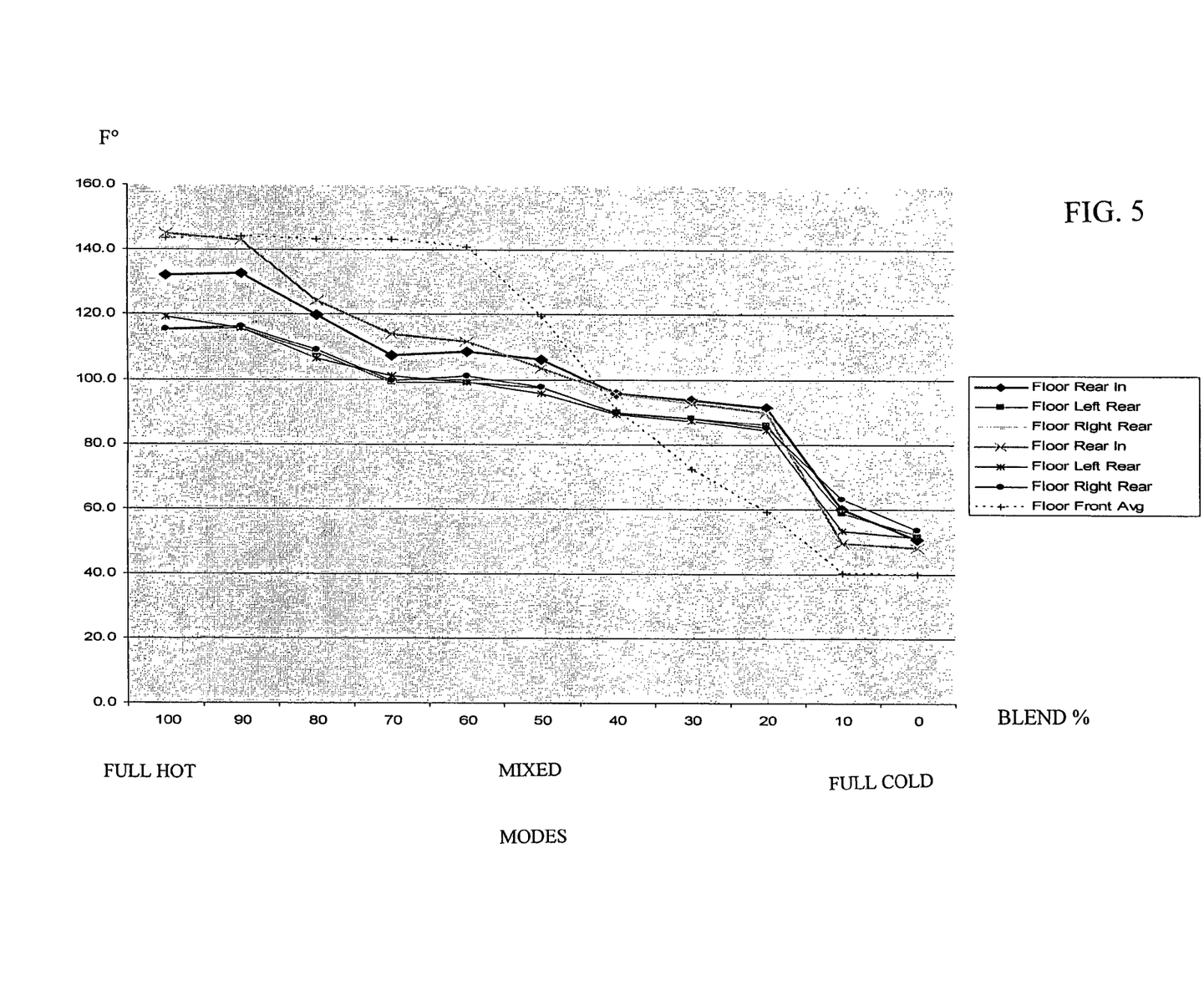
FIG. 5 is a graphic representation of the rear floor temperatures found in the prior art compared with the rear floor temperatures realized in accordance with an aspect of the present invention.

Referring to FIG. 5, a table illustrating the effect of a modified system (i.e. system with constructed channel) versus system without a channel as described above. Temperature distributions and variances are shown to be more appropriate in the rear distribution area due to the effect of the channel and valving features, in accordance with the present invention, in the bi-level setting versus prior art. Full hot, mixed and full code modes are shown in the bi-level setting, with changes in temperature due to temperature boost In the prior art, the rear floor temperatures are typically 20° to 30° F. lower than those of the present invention. In the 0 to 50% blend mixing range, the rear floor boosts higher than the front floor temperatures.

Figure 6:
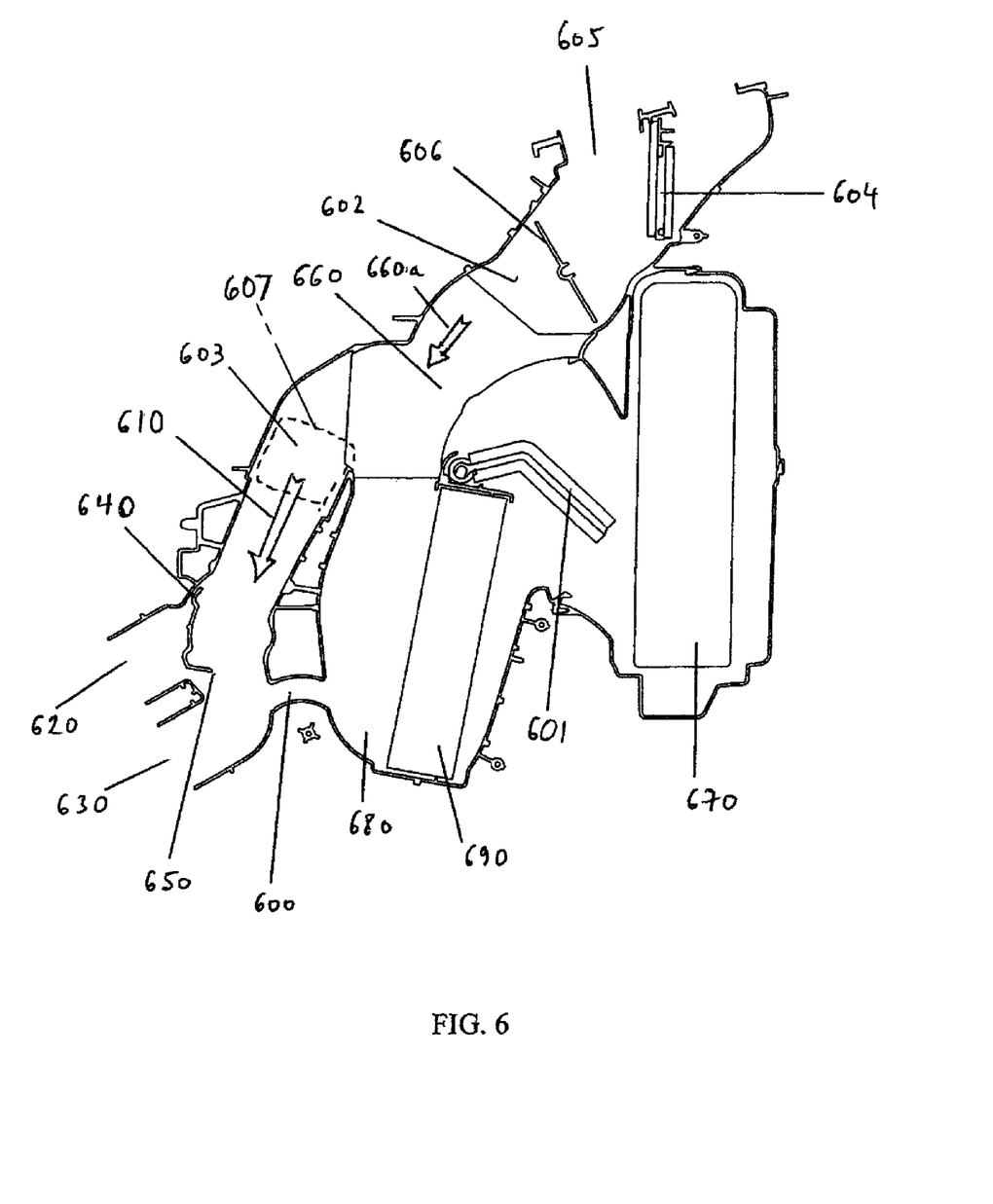
FIG. 6 is a cross sectional schematic view of an entire air conditioning system with HVAC, in accordance with an aspect of the present invention.

FIG. 6 is a schematic cross section of an HVAC unit in panel mode. The airflow path goes from evaporator (670) then via either cold path (660*a*) or hot path (680) via heater core (690). The flow mainly goes via the mixing baffle area (660) pending the setting of the blend door (601) to the rear mixing regions (610) or front mixing region (602). Flow can also passes from hot pass (680) front mixing region via bypass channel (600) pending the setting of the rear distribution mode door (640) which could close off the bypass channel (600) using the closing wall/device (650). The flow goes to panel (604), defrost (605), front floor (603), rear panel (620), or rear floor (630) all depending on door position of the doors; panel shut off door (606) panel defrost (604) floor front door (607) and rear distribution door (640) are illustrated. The temperature is set blend door (601).

Figure 7:
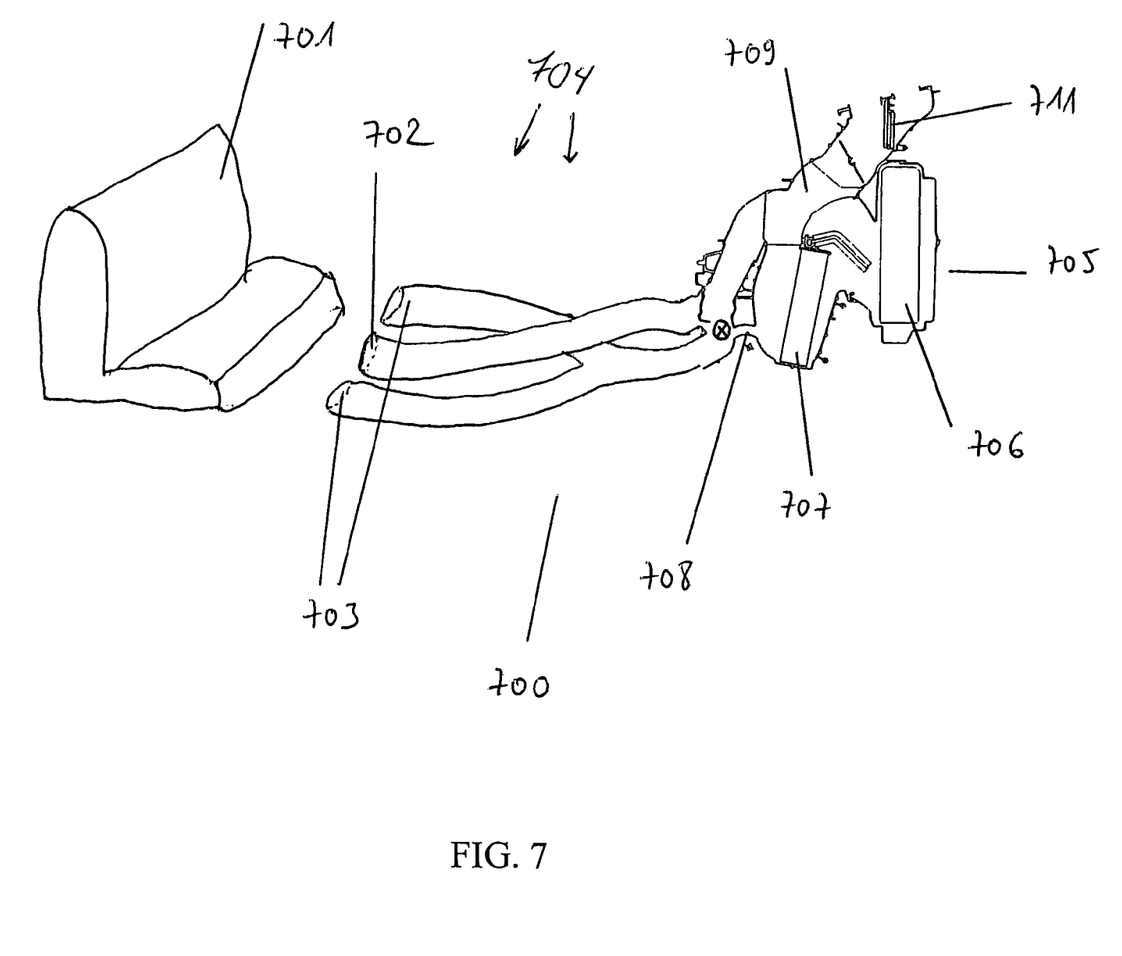
FIG. 7 is a representative design of an automobile with distribution air conditioning system in accordance with an aspect of the present invention.

FIG. 7 is a cross sectional schematic illustration of the interior of a motorized vehicle (700) and various distribution ducts. The rear is shown with rear seats (701), rear panel outlets (702), rear floor outlets (703), and front (704) where the front seats, for example, are located. The HVAC unit (705), shows evaporator (706), heater core (707), bypass channel (708), mixing baffle (709), blend door (710) and panel defrost door (711). The placement of closing wall/device and door (not illustrated) are demonstrated by an (X) downstream of the bypass channel (708).

The air for distribution in the most preferred embodiments of the present invention is, therefore, conditioned air or air that has an selectable temperature stratification or variation from one outlet relative to another outlet.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An air distribution system for heating, ventilation and air conditioning purposes for an automotive vehicle having an HVAC unit with at least one air heating device, at least one air cooling device, a heater core area immediately downstream of the at least one air heating device, an evaporator area immediately downstream of the at least one air cooling device, and front and rear distribution areas, the air distribution system comprising:
   an air duct to convey air downstream from the evaporator area towards the rear distribution area of the HVAC unit;
   at least one distribution door; and
   at least one hot channel to divert a portion of a flow of heated air from the heater core area directly to the rear distribution area, the hot channel being located directly between the heater core area and the rear distribution area;
   wherein the at least one distribution door is located between the air duct downstream of the evaporator area and the hot channel;
   and wherein the at least one distribution door regulates both the flow of heated air through the hot channel and airflow through the air duct to the rear distribution area.

2. An air distribution system as in claim 1, wherein the distribution door has a valving structure located on, attached to, or integral to the door.

3. An air distribution system as in claim 2, wherein the valving structure is integral to the door.

4. An air distribution system as in claim 2, wherein a mixing baffle is located in the air duct between the evaporator area and rear distribution area of the HVAC unit.

5. An air distribution system as in claim 4, wherein the distribution door is downstream of the mixing baffle.

6. An air distribution system for heating, ventilation and air conditioning purposes for an automotive vehicle having an HVAC unit with at least one air heating device, at least one air cooling device, a heater core area immediately downstream of the at least one air heating device, an evaporator area immediately downstream of the at least one air cooling device, and front and rear distribution areas, the air distribution system comprising:
   an air duct to convey air downstream from the evaporator area towards the rear distribution area of the HVAC unit;
   at least one distribution door; and
   at least one hot channel to divert a portion of a flow of heated air from the heater core area directly to the rear distribution area, the hot channel being located directly between the heater core area and the rear distribution area;
   wherein the at least one distribution door is located between the air duct downstream of the evaporator area and the hot channel;
   and wherein the distribution door is located in the air duct toward the rear distribution area of the automotive vehicle such that the valving structure can partially or totally block the passage of air directly or indirectly from the heater core area through the hot channel to the rear distribution area.

7. An air distribution system as in claim 6, wherein the valving structure is a tab, wall, baffle or the like.

8. An air distribution system as in claim 6, wherein the rear distribution area comprises a rear panel cold area and a rear floor warm area.

9. An air distribution system as in claim 8, wherein the distribution door, when allowing air to partially be blocked from the evaporator area to the rear panel cold area, also partially or fully blocks air from entering the rear floor warm area from the heater core area.

10. An air distribution system as in claim 8, wherein the distribution door is spatially situated so to be able to pivot between a panel mode and a floor mode.

11. An air distribution system as in claim 10, wherein in panel mode, essentially no air passes from the heater core area through the hot channel to the rear floor warm area.

12. An air distribution system as in claim 10, wherein in floor mode, baffle controlled air passes from the evaporator area to the rear panel cool area and air passes by the mixing baffle from the heater core area to the rear floor warm area of the vehicle.

13. An air distribution system as in claim 10, wherein in bi-level mode, baffle controlled air passes by the mixing baffle from the heater core region and evaporator region such that a comfortable thermal stratification state exists between front panel and front floor at the same time as it exists between rear panel and rear floor.

* * * * *